(12) United States Patent
Gill

(10) Patent No.: US 7,236,336 B2
(45) Date of Patent: Jun. 26, 2007

(54) METHOD AND APPARATUS FOR PROVIDING A FREE LAYER HAVING HIGHER SATURATION FIELD CAPABILITY AND OPTIMUM SENSITIVITY

(75) Inventor: Hardayal Singh Gill, Palo Alto, CA (US)

(73) Assignee: Hitachi Global Storage Technologies Inc, Netherlands B.V., Amsterdam (NL)

( * ) Notice: Subject to any disclaimer, the term of this patent is extended or adjusted under 35 U.S.C. 154(b) by 432 days.

(21) Appl. No.: 10/837,278

(22) Filed: Apr. 30, 2004

(65) Prior Publication Data

US 2005/0243479 A1    Nov. 3, 2005

(51) Int. Cl.
G11B 5/39    (2006.01)

(52) U.S. Cl. ................................. 360/324.12

(58) Field of Classification Search ............ 360/324.1, 360/324.11, 324.12, 324.2
See application file for complete search history.

(56) References Cited

U.S. PATENT DOCUMENTS

| | | | |
|---|---|---|---|
| 5,408,377 A * | 4/1995 | Gurney et al. ............. | 360/325 |
| 6,275,362 B1 | 8/2001 | Pinarbasi | |
| 6,469,877 B1 | 10/2002 | Knapp et al. | |
| 6,548,186 B1 * | 4/2003 | Carey et al. ................ | 428/611 |
| 6,650,512 B1 | 11/2003 | Gill | |
| 6,665,155 B2 | 12/2003 | Gill | |
| 6,806,804 B2 * | 10/2004 | Saito et al. ................. | 336/200 |
| 6,953,601 B2 * | 10/2005 | Li et al. ..................... | 427/131 |
| 7,130,167 B2 * | 10/2006 | Gill ........................ | 360/324.12 |
| 2002/0085323 A1 | 7/2002 | Smith et al. | |
| 2002/0114110 A1 | 8/2002 | Katakura et al. | |
| 2002/0126427 A1 | 9/2002 | Gill | |
| 2002/0135954 A1 | 9/2002 | Yoshikawa et al. | |
| 2003/0218836 A1 | 11/2003 | Shimazawa et al. | |
| 2003/0231437 A1 | 12/2003 | Childress et al. | |
| 2004/0141260 A1 * | 7/2004 | Hasegawa et al. ..... | 360/324.11 |
| 2004/0218311 A1 * | 11/2004 | Saito et al. ............... | 360/314 |
| 2004/0262654 A1 * | 12/2004 | Ohba et al. ................ | 257/295 |

FOREIGN PATENT DOCUMENTS

JP    2002299723 A   * 10/2002

* cited by examiner

Primary Examiner—William J Klimowicz
(74) Attorney, Agent, or Firm—David W. Lynch; Chambliss, Bahner & Stophel PC (57) ABSTRACT

A method and apparatus for providing a free layer having higher saturation field capability and optimum sensitivity (dr/R) is disclosed. The present invention provides a synthetic free layer that includes a first and second free layer, wherein the second free layer is a cobalt alloy that provides higher saturation and optimum sensitivity.

26 Claims, 7 Drawing Sheets

METHOD AND APPARATUS FOR PROVIDING A FREE LAYER HAVING HIGHER SATURATION FIELD CAPABILITY AND OPTIMUM SENSITIVITY

BACKGROUND OF THE INVENTION

1. Field of the Invention

This invention relates in general to magnetic read sensors, and more particularly to a method and apparatus for providing a free layer having higher saturation field capability and optimum sensitivity ($\Delta R/R$).

2. Description of Related Art

The heart of a computer is typically a magnetic disk drive which includes a rotating magnetic disk, a slider that has write and read heads, a suspension arm above the rotating disk and an actuator arm. The suspension arm biases the slider into contact with a parking ramp or the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

Most GMR devices have been designed so as to measure the resistance of the free layer for current flowing parallel to the film's plane. However, as the quest for ever greater densities continues, devices that measure current flowing perpendicular to the plane (CPP) have begun to emerge. A device that is particularly well suited to the CPP design is the magnetic tunneling junction (MTJ) in which the layer that separates the free and pinned layers is a non-magnetic insulator, such as alumina or silica. Its thickness needs to be such that it will transmit a significant tunneling current. The principle governing the operation of the MTJ is the change of resistivity of the tunnel junction between two ferromagnetic layers. When the magnetization of the two ferromagnetic layers is in opposite directions, the tunneling resistance increases due to a reduction in the tunneling probability.

A sensor includes a nonmagnetic electrically conductive or electrically nonconductive material spacer layer sandwiched between a ferromagnetic pinned layer and a ferromagnetic free layer. An antiferromagnetic pinning layer typically interfaces the pinned layer for pinning the magnetic moment of the pinned layer 90. degree to an air bearing surface (ABS) wherein the ABS is an exposed surface of the sensor that faces the rotating disk. The sensor is located between ferromagnetic first and second shield layers. For a CPP sensor, first and second leads are connected to a bottom and a top respectively of the sensor for conducting a current perpendicular to the major thin film planes of the sensor. This is in contrast to a CIP sensor where the current is conducted in plane parallel to the major thin film planes (CIP) of the sensor.

A magnetic moment of the free layer is free to rotate upwardly and downwardly with respect to the ABS from a quiescent or zero bias point position in response to positive and negative magnetic field signals from the rotating magnetic disk. The quiescent position of the magnetic moment of the free layer, which is parallel to the ABS, is when the current is conducted through the sensor without magnetic field signals from the rotating magnetic disk.

When the free layer is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field. If the direction of the pinned field is parallel to the free layer, electrons passing between the free and pinned layers, suffer less scattering. Thus, the resistance at this state is lower. If, however, the magnetization of the pinned layer is antiparallel to that of the free layer, electrons moving from one layer into the other will suffer more scattering so the resistance of the structure will increase.

The sensitivity of the sensor is quantified as magnetoresistance or magnetoresistive coefficient $\Delta R/R$ where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. A spin valve sensor is sometimes referred to as a giant magnetoresistive (GMR) sensor. The sensitivity of a spin valve sensor depends upon the response of the free layer to signal fields from a rotating magnetic disk. The magnetic moment of the free layer or free layer structure depends upon the material or materials employed for the free layer structure. As the magnetic moment of the free layer structure increases the responsiveness of the free layer structure decreases. This means that for a given field signal from the rotating magnetic disk the magnetic moment of the free layer structure will not rotate as far from its parallel position to the ABS, which causes a reduction in signal output. The addition of a cobalt or cobalt based layer increases the stiffness of the free layer structure in its response to field signals and reduces the sensitivity of the spin valve sensor.

Although the layers enumerated above are all that is needed to produce the GMR or MTJ effects, additional problems remain. With longitudinal recording, the field from the media is stronger and thus an increase in the stiffness of the free layer would be desirable to prevent saturation. However, increasing the stiffness of the free layer structure in its response to field signals reduces the sensitivity of the spin valve sensor. Further, in order to meet higher signal requirements it would be desirable to reduce the thickness of the free layer besides improving the GMR ratio itself. However, thinning of the free layer causes a low GMR ratio and poor thermal stability. A synthetic free layer would seem to provide a way to maintain good thermal stability but, in both in CIP and CPP structures, synthetic free layers actually cause a GMR loss due to current shunting in CIP and the subtractive result of the free layers. It has been found that a free layer thickness of approximately 35 Å provides maximum sensitivity, i.e., $\Delta R/R$. However, sensors with a free layer thickness of approximately 35 Å exhibit saturation for perpendicular reading environments.

It can be seen then that there is a need for a method and apparatus for providing a free layer having higher saturation field capability and optimum sensitivity (dr/R).

SUMMARY OF THE INVENTION

To overcome the limitations described above, and to overcome other limitations that will become apparent upon reading and understanding the present specification, the present invention discloses a method and apparatus for providing a free layer having higher saturation field capability and optimum sensitivity (dr/R).

The present invention solves the above-described problems by providing a synthetic free layer that includes a first and second free layer, wherein the second free layer is a cobalt alloy that provides higher saturation and optimum sensitivity.

A synthetic free layer in accordance with the principles of the present invention includes a first free layer, a composite coupling layer disposed over the first free layer and a second free layer disposed over the coupling layer, the second free layer comprising a cobalt alloy including at least one of nickel, niobium, molybdenum, tungsten, silicon and boron.

In another embodiment of the present invention, another synthetic free layer for a magnetic read sensor is provided. This synthetic free layer includes a first free layer, a coupling layer disposed over the first free layer and a second free layer disposed over the coupling layer, the second free layer comprising a cobalt alloy including at least one of molybdenum, tungsten, silicon and boron.

In another embodiment of the present invention, a method for forming a synthetic free layer for a magnetic read sensor is provided. The method includes forming a first free layer, forming a composite coupling layer over the first free layer and forming a second free layer over the coupling layer, the second free layer comprising a cobalt alloy including at least one of nickel, niobium, molybdenum, tungsten, silicon and boron.

In another embodiment of the present invention, another method for forming a synthetic free layer for a magnetic read sensor is provided. This method includes forming a first free layer, forming a coupling layer over the first free layer and forming a second free layer over the coupling layer, the second free layer comprising a cobalt alloy including at least one of molybdenum, tungsten, silicon and boron.

In another embodiment of the present invention, a magnetic read sensor is provided. The magnetic read sensor includes a ferromagnetic fixed layer having a magnetization direction pinned in a particular direction, a synthetic free layer having a magnetization that is free to rotate and a non-magnetic spacer layer disposed between the ferromagnetic pinned layer and the synthetic free layer, wherein the synthetic free layer includes a first free layer, a composite coupling layer disposed over the first free layer and a second free layer disposed over the coupling layer, the second free layer comprising a cobalt alloy including at least one of nickel, niobium, molybdenum, tungsten, silicon and boron.

In another embodiment of the present invention, another magnetic read sensor is provided. This magnetic read sensor includes a ferromagnetic fixed layer having a magnetization direction pinned in a particular direction, a synthetic free layer having a magnetization that is free to rotate and a non-magnetic spacer layer disposed between the ferromagnetic pinned layer and the synthetic free layer, wherein the synthetic free layer includes a first free layer, a coupling layer disposed over the first free layer and a second free layer disposed over the coupling layer, the second free layer comprising a cobalt alloy including at least one of molybdenum, tungsten, silicon and boron.

In another embodiment of the present invention, a magnetic storage device is provided. The magnetic storage device includes a magnetic media for storing data thereon, a motor, coupled to the magnetic media, for translating the magnetic media, and a transducer for reading and writing data on the magnetic media and an actuator, coupled to the transducer, for moving the transducer relative to the magnetic media, wherein the transducer includes a read sensor having a synthetic free layer, the synthetic free layer comprising a first free layer, a composite coupling layer disposed over the first free layer and a second free layer disposed over the coupling layer, the second free layer comprising a cobalt alloy including at least one of nickel, niobium, molybdenum, tungsten, silicon and boron.

In another embodiment of the present invention, another magnetic storage device is provided. This magnetic storage device includes a magnetic media for storing data thereon, a motor, coupled to the magnetic media, for translating the magnetic media, a transducer for reading and writing data on the magnetic media and an actuator, coupled to the transducer, for moving the transducer relative to the magnetic media, wherein the transducer includes a read sensor having a synthetic free layer, the synthetic free layer comprising a first free layer, a coupling layer disposed over the first free layer and a second free layer disposed over the coupling layer, the second free layer comprising a cobalt alloy including at least one of molybdenum, tungsten, silicon and boron.

In another embodiment of the present invention, another synthetic free layer is provided. This synthetic free layer includes first means for providing a first magnetization that is free to rotate, coupling means disposed over the first free layer for providing a first and second soft magnetic layer and second means, disposed over the coupling layer, for providing a second magnetization that is free to rotate, the second means comprising a cobalt alloy including at least one of nickel, niobium, molybdenum, tungsten, silicon and boron.

In another embodiment of the present invention, another synthetic free layer is provided. This synthetic free layer includes first means for providing a first magnetization that is free to rotate, coupling means disposed over the first free layer and second means, disposed over the coupling layer, for providing a second magnetization that is free to rotate, the second means comprising a cobalt alloy including at least one of molybdenum, tungsten, silicon and boron.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a free layer having higher saturation field capability and optimum sensitivity (dr/R). The present invention provides a synthetic free layer that includes a first and second free layer, wherein the second free layer is a cobalt alloy that provides higher saturation and optimum sensitivity.

Figure 1:
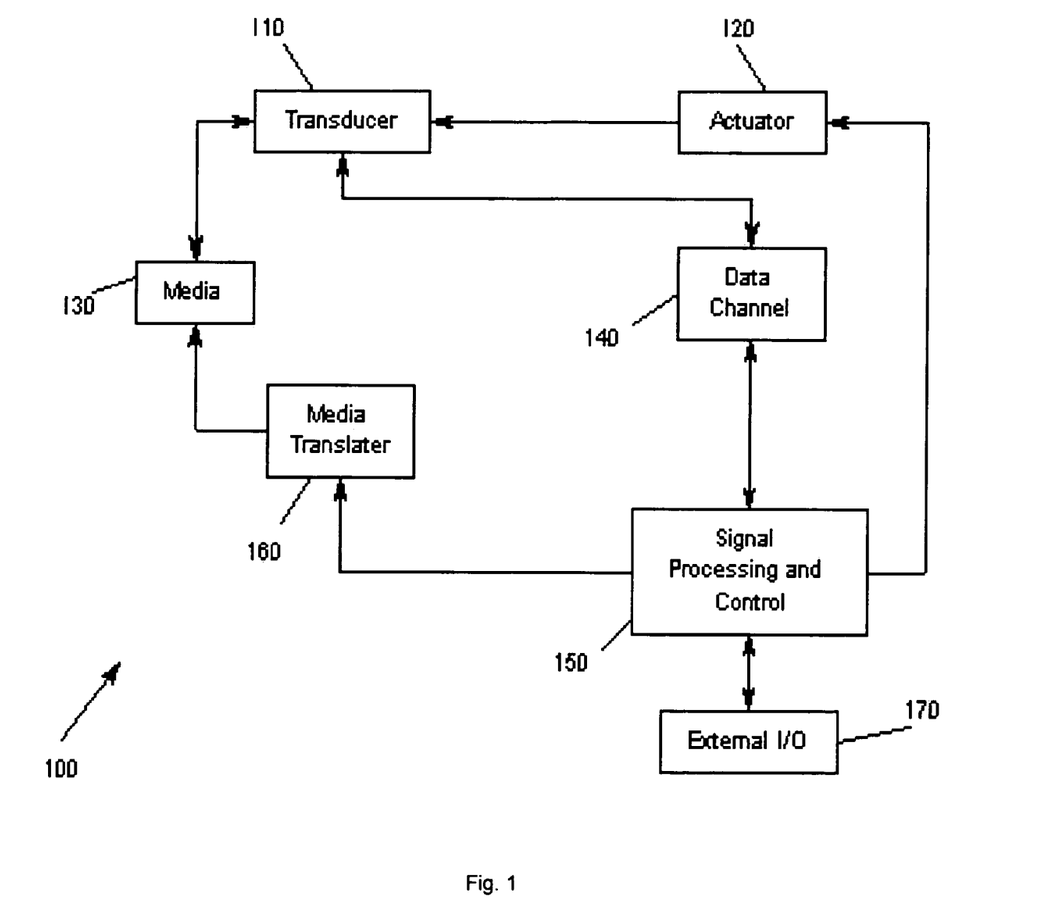
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
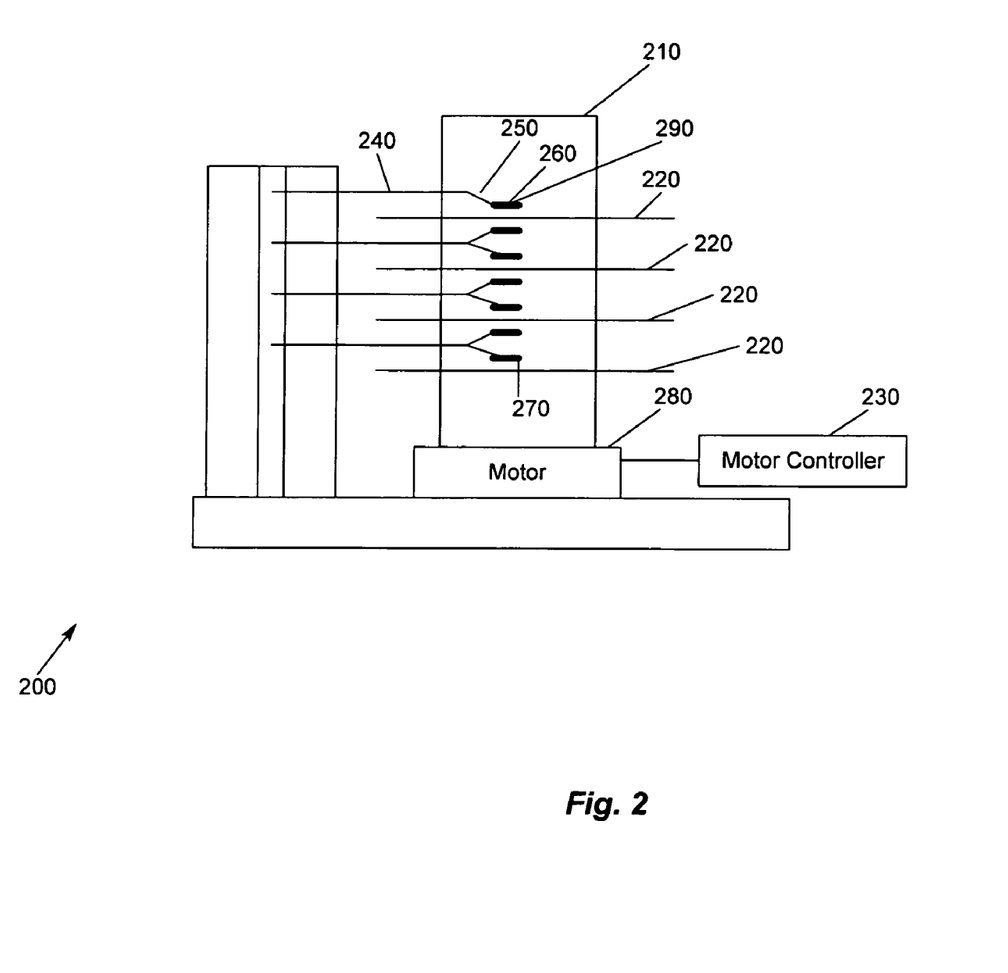
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
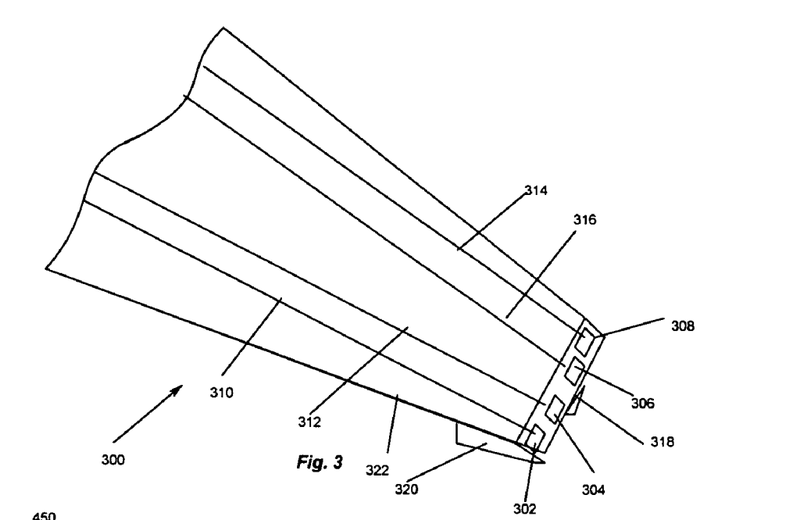
FIG. 3 illustrates a slider mounted on a suspension according to an embodiment of the present invention.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

Figure 4:
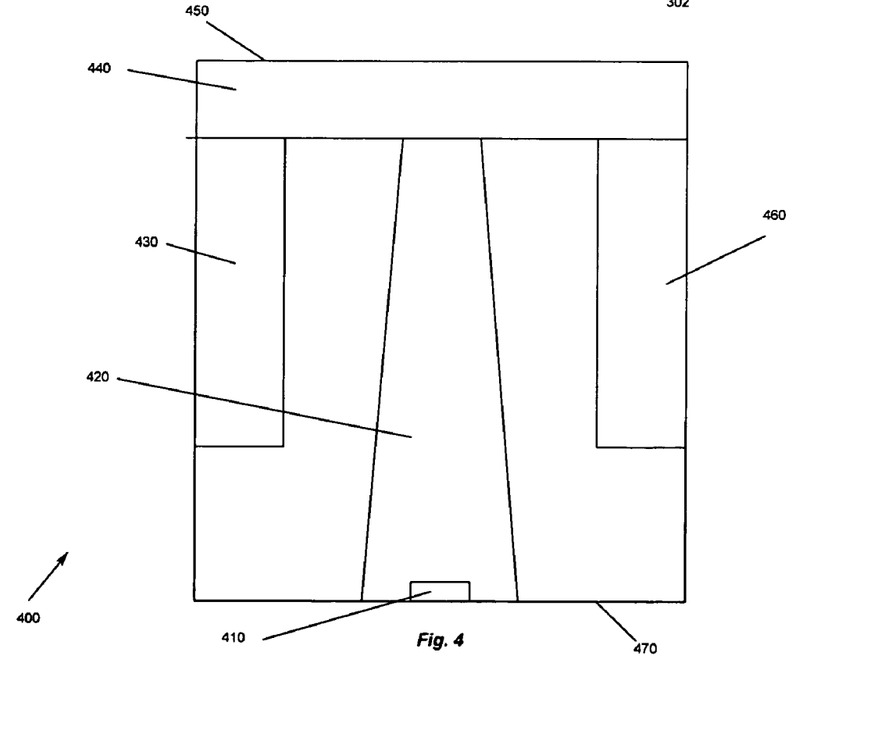
FIG. 4 illustrates an ABS view of the slider and the magnetic head according to an embodiment of the present invention.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1–4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
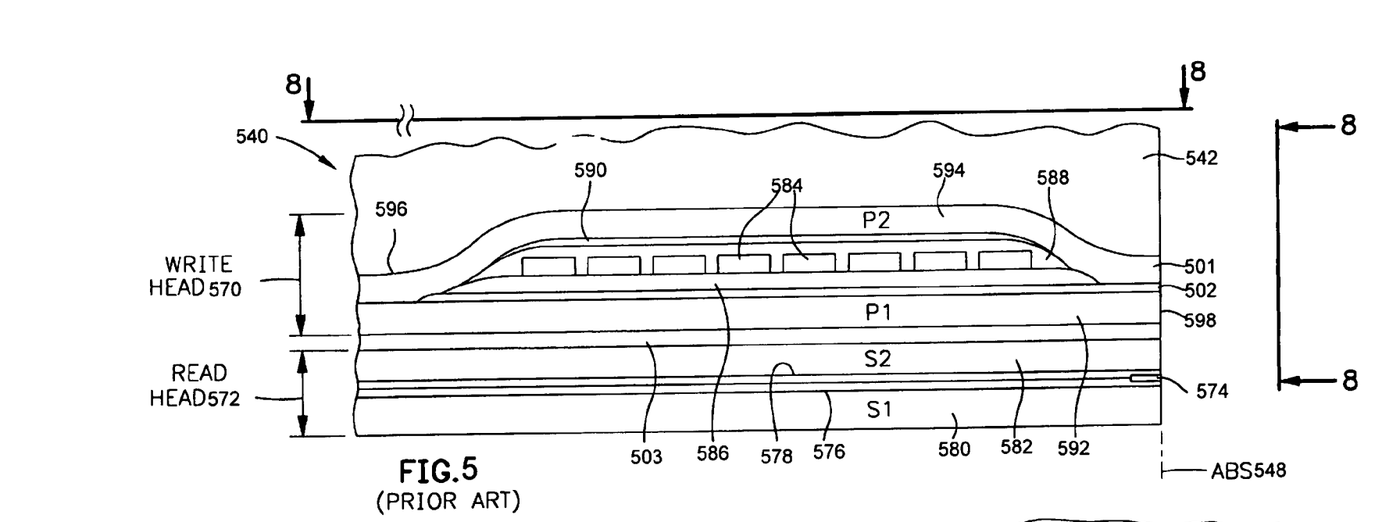
FIG. 5 is a side cross-sectional elevation view of a magnetic head.
Figure 6:
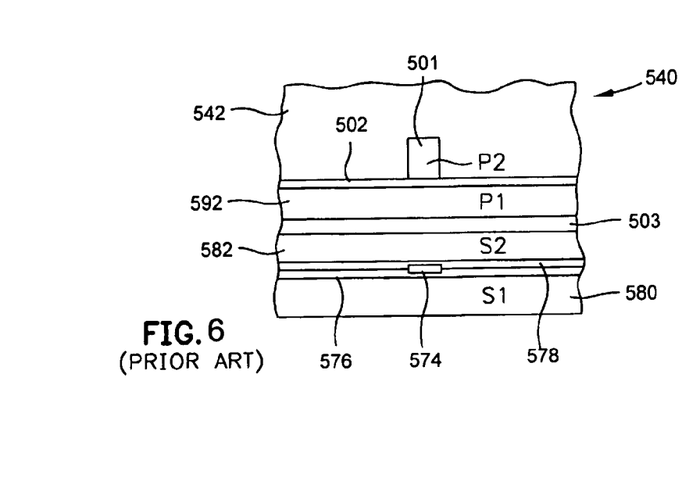
FIG. 6 is an air bearing surface (ABS) view of the magnetic head of FIG. 5.

FIG. 5 is a side cross-sectional elevation view of a magnetic head 540. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current Is conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

Figure 7:
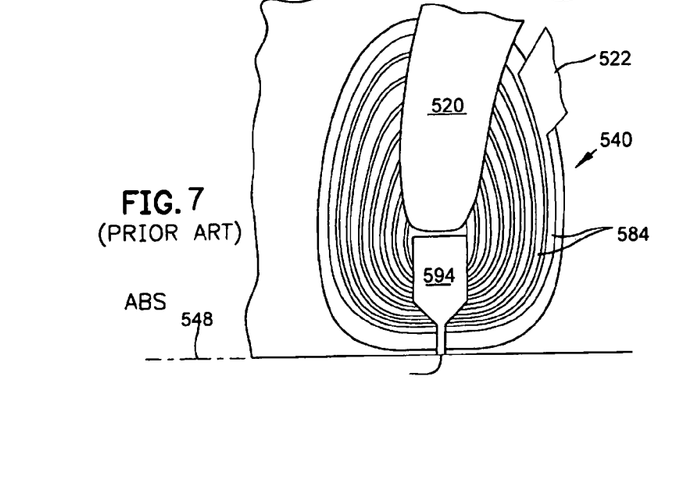
FIG. 7 illustrates the connect leads coupled to the coil for the write pole piece.

FIG. 7 illustrates a view of the connect leads 520, 522 coupled to the coil 584 for the write pole piece 594. As shown in FIGS. 4–7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

Figure 8:
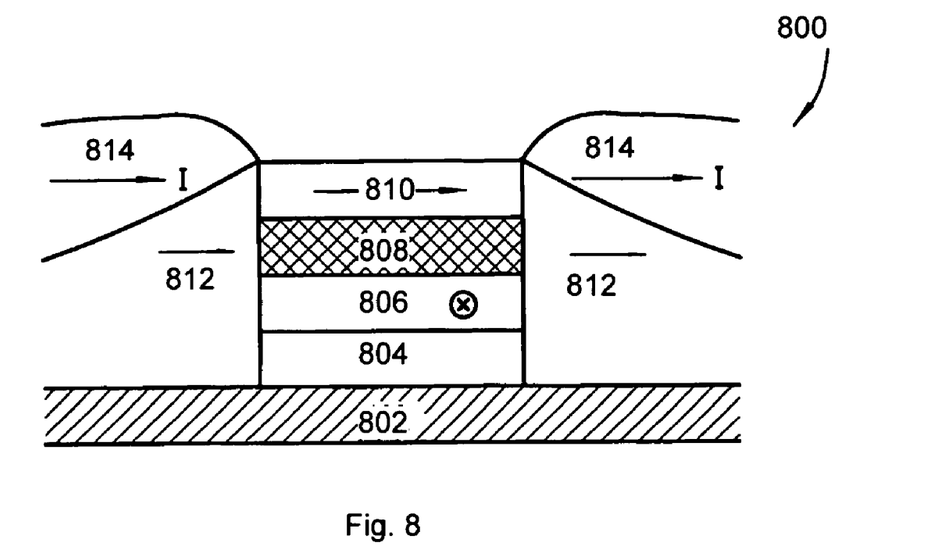
FIG. 8 illustrates the basic components of a typical current-in-plane (CIP) GMR sensor according to one embodiment of the present invention.

FIG. 8 illustrates the basic components of a typical current-in-plane (CIP) GMR sensor 800 according to one embodiment of the present invention. The sensor 800 includes a ferromagnetic reference layer 806 with a fixed transverse magnetic moment (pointing into the page) and a ferromagnetic free layer 810 with a rotatable magnetization vector, which can rotate about the longitudinal direction in response to transverse magnetic signal fields. The direction of the magnetic moment of the reference layer 806 is typically fixed by exchange coupling with an antiferromagnetic layer 804. Exchange-pinned reference layer 806 and free layer 810 are separated by a thin electrically conductive nonmagnetic layer 808. Hard bias layers 812 provide a longitudinal biasing magnetic field to stabilize the magnetization of the free layer 810 approximately in a longitudinal orientation in the absence of other external magnetic fields. Sensor 800 further includes top electrical leads 814 in proximity with hard bias layers 812, and a layer 802 adjacent to the antiferromagnetic layer 804, which represents a combination of the substrate, undercoat, and seed layers. For a shielded sensor, layer 802 may additionally include the bottom shield and insulation layers (for CIP sensors) or electrical contact layers (for CPP sensors).

Figure 9:
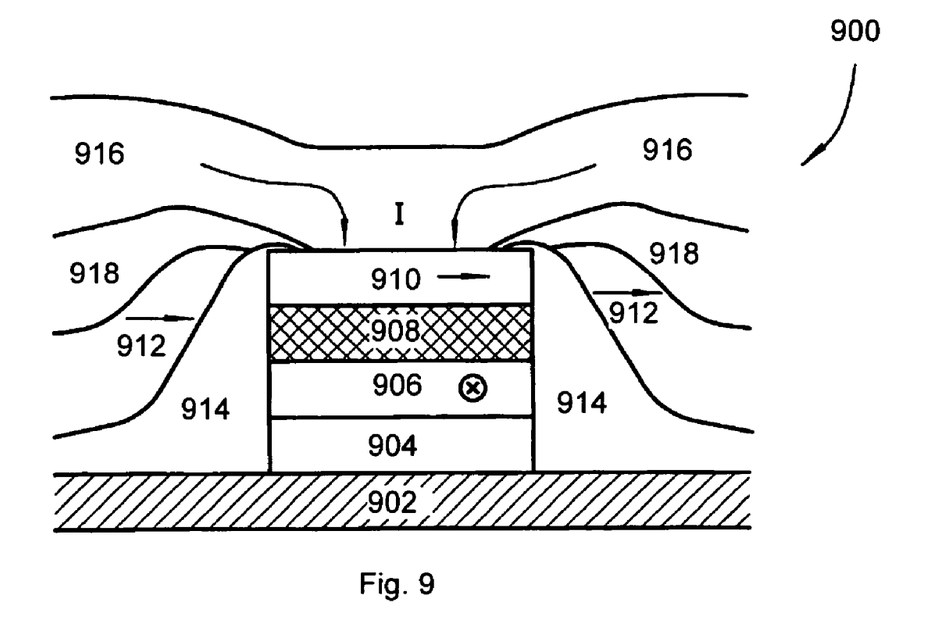
FIG. 9 shows a current-perpendicular-to-plane (CPP) sensor according to one embodiment of the present invention.

FIG. 9 shows a current-perpendicular-to-plane (CPP) sensor 900 according to one embodiment of the present invention. CPP sensor 900 includes a ferromagnetic reference layer 906 with a fixed magnetic moment oriented transversely (into the page) and a ferromagnetic free layer 910 with a rotatable magnetization vector, which can rotate about the longitudinal direction in response to transverse magnetic signal fields. The direction of the magnetic moment of the reference layer 906 is typically fixed by exchange coupling with an antiferromagnetic layer 904. The exchange-pinned reference layer 906 and free layer 910 are spaced apart by a non-magnetic layer 908. For MTJ devices, layer 908 includes an electrically insulating tunnel barrier layer. For CPP-GMR devices, layer 908 is electrically conductive, and is analogous to layer 808 of the CIP-GMR sensor of FIG. 8. Hard bias layers 912 are electrically insulated from the sensor stack and the top electrical lead 916 by insulating layers 914 and 918 respectively. Hard bias layers 912 provide a longitudinal biasing magnetic field to stabilize the magnetization of the free layer 910. Sensor 900 further includes a layer 902, which is similar to layer 802 of sensor 800, in proximity with the antiferromagnetic layer 904.

The above description of a CPP and CIP magnetic sensor, shown in the accompanying FIGS. 8–9, is for presentation purposes only. Those skilled in the art will recognize that other embodiments that provide CPP and CIP sensors are possible, including dual sensor structures, self-pinned structures, etc.

Figure 10:
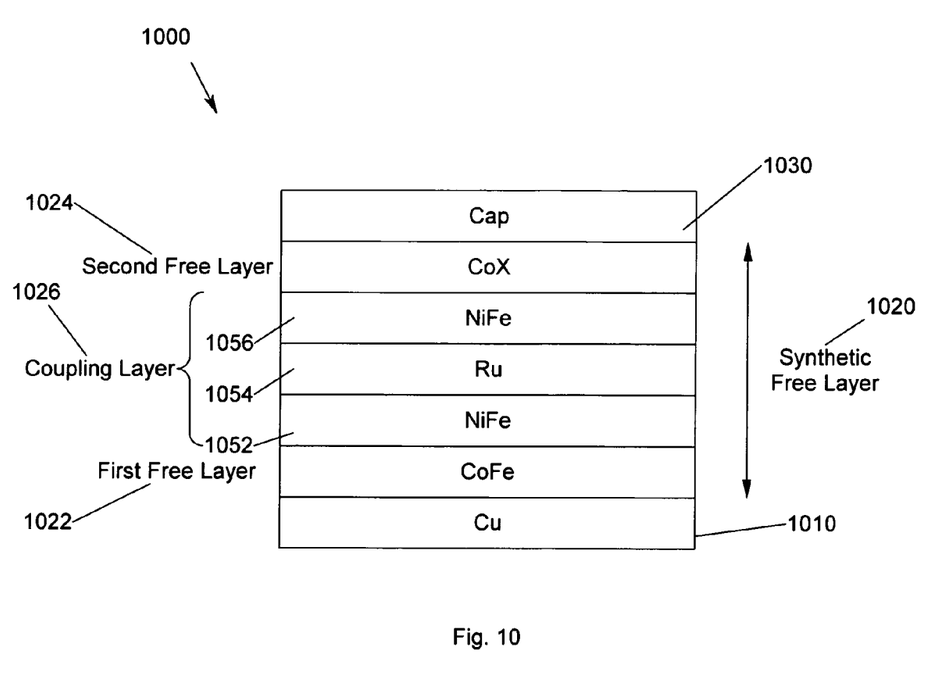
FIG. 10 illustrates a sensor stack showing a synthetic free layer according to an embodiment of the present invention.

FIG. 10 illustrates a sensor stack showing a synthetic free layer 1000 according to an embodiment of the present invention. In FIG. 10, a synthetic free layer 1020 is disposed over a copper spacer layer 1010. The synthetic free layer 1020 includes a first free layer 1022 disposed over the copper spacer layer 1010 and a second free layer 1024, separated from the first free layer 1022 by a composite coupling layer 1026, is provided. A cap 1030 may be formed over the second free layer 1024. The composite coupling layer 1026 may include a first NiFe layer 1050, an interlayer 1054 such as Ru, and a second NiFe layer 1056. The two free layers 1022, 1024 are exchange coupled across the composite coupling layer 1026. The NiFe layers 1050, 1052 of the composite coupling layer 1026 provide magnetic softness for the free layer structure 1000.

The second free layer 1024 comprises a cobalt alloy comprising at least one of Ni, Nb, Mo, W, Si or B. The second free layer 1024 thus provides higher saturation and optimum sensitivity. The use of a higher $H_k$ material in the second free layer 1024 avoids saturation of the free layer 1000 without degrading the sensitivity of the sensor.

Figure 11:
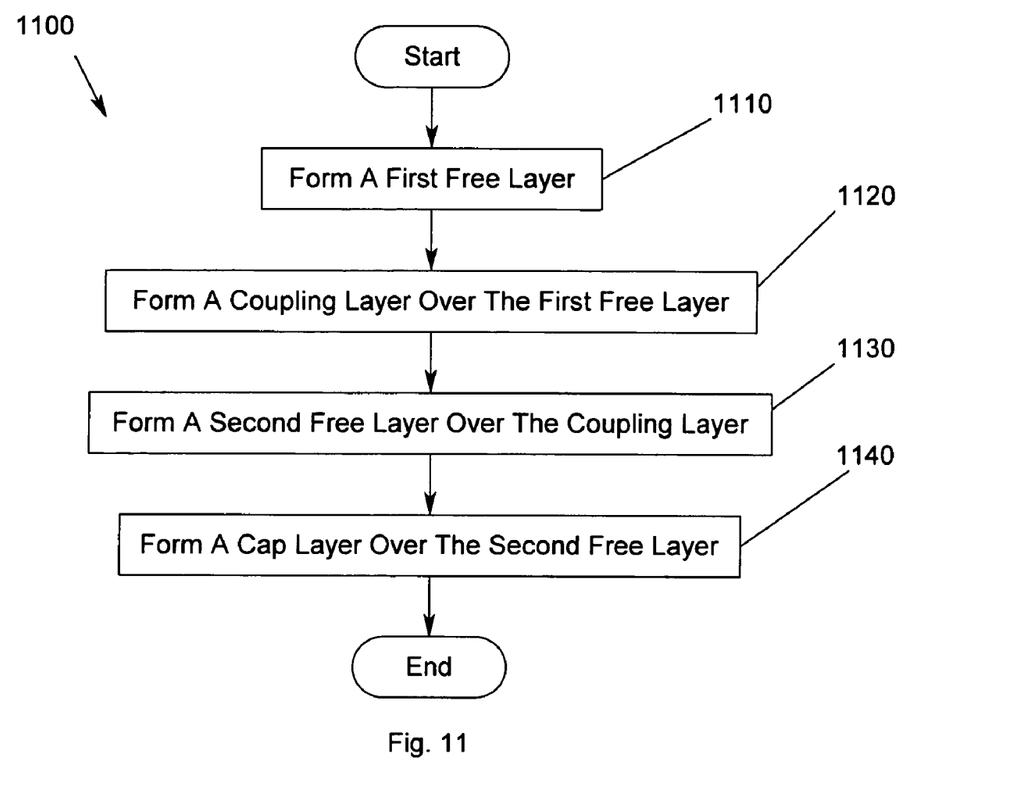
FIG. 11 is a flow chart of a method for providing a free layer having higher saturation field capability and optimum sensitivity (ΔR/R) according to an embodiment of the present invention.

FIG. 11 is a flow chart of a method for providing a free layer having higher saturation field capability and optimum sensitivity ($\Delta R/R$) according to an embodiment of the present invention. A first free layer is formed 1110. A coupling layer is formed over the first free layer 1120. The coupling layer may be a composite coupling layer comprising a first NiFe layer, an interlayer such as Ru, and a second NiFe layer. A second free layer is formed over the coupling layer 1130. The second free layer is a cobalt alloy comprising at least one of Ni, Nb, Mo, W, Si or B. A cap layer may be formed over the second free layer 1140.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A synthetic free layer for a magnetic read sensor, comprising:
   a first free layer,
   a composite coupling layer disposed over the first free layer, wherein the composite coupling layer comprises a first NiFe layer, an interlayer and a second NiFe layer; and
   a second free layer disposed over the coupling layer, the second free layer comprising a cobalt alloy including at least one of nickel, niobium, molybdenum, tungsten, silicon and boron.

2. The synthetic free layer of claim 1, wherein the interlayer comprises ruthenium.

3. The synthetic free layer of claim 1, wherein the first free layer comprises CoFe.

4. The synthetic free layer of claim 1, wherein the cobalt alloy including at least one of nickel, niobium, molybdenum, tungsten, silicon and boron prevents saturation without degrading magnetoresistive sensitivity.

5. The synthetic free layer of claim 1, wherein the cobalt alloy including at least one of nickel, niobium, molybdenum, tungsten, silicon and boron provides higher magnetic anisotropy to avoid saturation.

6. A synthetic free layer for a magnetic read sensor, comprising:
   a first free layer,
   a coupling layer disposed over the first free layer, wherein the coupling layer comprises a first NiFe layer, an interlayer and a second NiFe layer; and
   a second free layer disposed over the coupling layer, the second free layer comprising a cobalt alloy including at least one of molybdenum, tungsten, silicon and boron.

7. The synthetic free layer of claim 6, wherein the interlayer comprises ruthenium.

8. The synthetic free layer of claim 6, wherein the first free layer comprises CoFe.

9. The synthetic free layer of claim 6, wherein the cobalt alloy including at least one of, molybdenum, tungsten, silicon and boron prevents saturation without degrading magnetoresistive sensitivity.

10. The synthetic free layer of claim 6, wherein the cobalt alloy including at least one of, molybdenum, tungsten, silicon and boron provides higher magnetic anisotropy to avoid saturation.

11. A method for forming a synthetic free layer for a magnetic read sensor, comprising:
forming a first free layer,
forming a composite coupling layer over the first free layer, wherein the composite coupling layer comprises a first NiFe layer, an interlayer and a second NiFe layer; and
forming a second free layer over the coupling layer, the second free layer comprising a cobalt alloy including at least one of nickel, niobium, molybdenum, tungsten, silicon and boron.

12. A method for forming a synthetic free layer for a magnetic read sensor, comprising:
forming a first free layer,
forming a coupling layer over the first free layer, wherein the forming the coupling layer comprises forming a first NiFe layer, an interlayer and a second NiFe layer; and
forming a second free layer over the coupling layer, the second free layer comprising a cobalt alloy including at least one of molybdenum, tungsten, silicon and boron.

13. A magnetic read sensor, comprising:
a ferromagnetic fixed layer having a magnetization direction pinned in a particular direction;
a synthetic free layer having a magnetization that is free to rotate; and
a non-magnetic spacer layer disposed between the ferromagnetic pinned layer and the synthetic free layer;
wherein the synthetic free layer comprises:
a first free layer,
a composite coupling layer disposed over the first free layer, wherein the composite coupling layer comprises a first NiFe layer, an interlayer and a second NiFe layer; and
a second free layer disposed over the coupling layer, the second free layer comprising a cobalt alloy including at least one of nickel, niobium, molybdenum, tungsten, silicon and boron.

14. The synthetic free layer of claim 13, wherein the interlayer comprises ruthenium.

15. The synthetic free layer of claim 13, wherein the first free layer comprises CoFe.

16. The synthetic free layer of claim 13, wherein the cobalt alloy including at least one of nickel, niobium, molybdenum, tungsten, silicon and boron prevents saturation without degrading magnetoresistive sensitivity.

17. The synthetic free layer of claim 13, wherein the cobalt alloy including at least one of nickel, niobium, molybdenum, tungsten, silicon and boron provides higher magnetic anisotropy to avoid saturation.

18. A magnetic read sensor, comprising:
a ferromagnetic fixed layer having a magnetization direction pinned in a particular direction;
a synthetic free layer having a magnetization that is free to rotate; and
a non-magnetic spacer layer disposed between the ferromagnetic pinned layer and the synthetic free layer;
wherein the synthetic free layer comprises:
a first free layer,
a coupling layer disposed over the first free layer, wherein the coupling layer comprises a first NiFe layer, an interlayer and a second NiFe layer; and
a second free layer disposed over the coupling layer, the second free layer comprising a cobalt alloy including at least one of molybdenum, tungsten, silicon and boron.

19. The synthetic free layer of claim 18, wherein the interlayer comprises ruthenium.

20. The synthetic free layer of claim 18, wherein the first free layer comprises CoFe.

21. The synthetic free layer of claim 18, wherein the cobalt alloy including at least one of, molybdenum, tungsten, silicon and boron prevents saturation without degrading magnetoresistive sensitivity.

22. The synthetic free layer of claim 18, wherein the cobalt alloy including at least one of, molybdenum, tungsten, silicon and boron provides higher magnetic anisotropy to avoid saturation.

23. A magnetic storage device, comprising:
a magnetic media for storing data thereon;
a motor, coupled to the magnetic media, for translating the magnetic media;
a transducer for reading and writing data on the magnetic media; and
an actuator, coupled to the transducer, for moving the transducer relative to the magnetic media;
wherein the transducer includes a read sensor having a synthetic free layer, the synthetic free layer comprising a first free layer, a composite coupling layer disposed over the first free layer and a second free layer disposed over the coupling layer, the second free layer comprising a cobalt alloy including at least one of nickel, niobium, molybdenum, tungsten, silicon and boron and wherein the composite coupling layer comprises a first NiFe layer, an interlayer and a second NiFe layer.

24. A magnetic storage device, comprising:
a magnetic media for storing data thereon;
a motor, coupled to the magnetic media, for translating the magnetic media;
a transducer for reading and writing data on the magnetic media; and
an actuator, coupled to the transducer, for moving the transducer relative to the magnetic media;
wherein the transducer includes a read sensor having a synthetic free layer, the synthetic free layer comprising a first free layer, a coupling layer disposed over the first free layer and a second free layer disposed over the coupling layer, the second free layer comprising a cobalt alloy including at least one of molybdenum, tungsten, silicon and boron and wherein the coupling layer comprises a first NiFe layer, an interlayer and a second NiFe layer.

25. A synthetic free layer for a magnetic read sensor, comprising:
first means for providing a first magnetization that is free to rotate;
coupling means disposed over the first means for providing a first and second soft magnetic layer, wherein the coupling means comprises a first NiFe layer, an interlayer and a second NiFe layer; and
second means, disposed over the coupling means, for providing a second magnetization that is free to rotate, the second means comprising a cobalt alloy including at least one of nickel, niobium, molybdenum, tungsten, silicon and boron.

26. A synthetic free layer for a magnetic read sensor, comprising:
   first means for providing a first magnetization that is free to rotate;
   coupling means disposed over the first means, wherein the coupling layer comprises a first NiFe means, an interlayer and a second NiFe layer; and
   second means, disposed over the coupling means, for providing a second magnetization that is free to rotate, the second means comprising a cobalt alloy including at least one of molybdenum, tungsten, silicon and boron.

* * * * *

UNITED STATES PATENT AND TRADEMARK OFFICE
CERTIFICATE OF CORRECTION

| | | |
|---|---|---|
| PATENT NO. | : 7,236,336 B2 | Page 1 of 1 |
| APPLICATION NO. | : 10/837278 | |
| DATED | : June 26, 2007 | |
| INVENTOR(S) | : Gill | |

It is certified that error appears in the above-identified patent and that said Letters Patent is hereby corrected as shown below:

Assignee:

"Hitachi Global Storage Technologies Inc, Netherlands B.V.", should read -- Hitachi Global Storage Technologies Netherlands B.V.--

Signed and Sealed this

Fourth Day of September, 2007

JON W. DUDAS
*Director of the United States Patent and Trademark Office*